(12) United States Patent
Siciliano

(10) Patent No.: US 11,807,412 B2
(45) Date of Patent: Nov. 7, 2023

(54) CONTAINER PREFORM

(71) Applicant: AMCOR RIGID PACKAGING USA, LLC, Ann Arbor, MI (US)

(72) Inventor: John Siciliano, Dexter, MI (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 338 days.

(21) Appl. No.: 17/253,663

(22) PCT Filed: Jun. 20, 2019

(86) PCT No.: PCT/US2019/038148
§ 371 (c)(1),
(2) Date: Dec. 18, 2020

(87) PCT Pub. No.: WO2019/246346
PCT Pub. Date: Dec. 26, 2019

(65) Prior Publication Data
US 2021/0261283 A1  Aug. 26, 2021

Related U.S. Application Data

(60) Provisional application No. 62/688,690, filed on Jun. 22, 2018.

(51) Int. Cl.
*B29C 49/12* (2006.01)
*B65D 1/02* (2006.01)
(Continued)

(52) U.S. Cl.
CPC ............ *B65D 1/0223* (2013.01); *B29B 11/14* (2013.01); *B29C 49/071* (2022.05); *B29C 49/12* (2013.01);
(Continued)

(58) Field of Classification Search
CPC ........ B65D 1/02; B65D 1/0223; B29C 49/12; B29C 49/20; B29C 49/071; B29K 2067/003; B29B 2911/1474
See application file for complete search history.

(56) References Cited

U.S. PATENT DOCUMENTS 4,725,464 A * 2/1988 Collette ............... B65D 1/0223
215/16
4,863,046 A * 9/1989 Collette ............... B29C 49/6409
215/381
(Continued)

FOREIGN PATENT DOCUMENTS

JP          2013078958 A    5/2013
JP          5631183 B2     11/2014

OTHER PUBLICATIONS

International Search Report and Written Opinion of the ISA issued in PCT/US2019/038148, dated Oct. 1, 2019; ISA/KR.

*Primary Examiner* — Galen H Hauth
*Assistant Examiner* — Shibin Liang
(74) *Attorney, Agent, or Firm* — Harness, Dickey & Pierce, P.L.C.

(57) ABSTRACT

A preform configured to form a container by stretch blow molding. A finish portion of the preform is at a first end of the preform. The finish portion is a container finish of the container. A support flange is at the finish portion. A tip portion is at a second end of the preform opposite to the first end and is configured to form a container base. A neck portion is adjacent to the support flange, and is configured to form a neck portion. An external stretch radius is at an outer surface of the neck portion. An internal stretch radius is at an inner surface of the neck portion. A first distance is between the internal stretch radius and the external stretch (Continued)

radius and is equal to, or greater than, four times a second distance between the external stretch radius and the support flange.

6 Claims, 13 Drawing Sheets

(51) Int. Cl.
    *B29C 49/00*     (2006.01)
    *B29B 11/14*     (2006.01)
    *B29K 67/00*     (2006.01)
    *B29L 31/00*     (2006.01)

(52) U.S. Cl.
    CPC   *B29C 2949/077* (2022.05); *B29C 2949/0833* (2022.05); *B29C 2949/0851* (2022.05); *B29K 2067/003* (2013.01); *B29L 2031/7158* (2013.01)

(56) References Cited

U.S. PATENT DOCUMENTS

| | | | |
|---|---|---|---|
| 5,198,248 A * | 3/1993 | Krishnakumar | B29C 49/071 425/525 |
| 8,241,718 B2 | 8/2012 | Witz et al. | |
| 8,956,707 B2 | 2/2015 | Hanan | |
| 2010/0304168 A1 | 12/2010 | Dornbach | |

\* cited by examiner

CONTAINER PREFORM

CROSS-REFERENCE TO RELATED APPLICATIONS

This application is a U.S. National Phase Application under 35 U.S.C. 371 of International Application No. PCT/US2019/038148, filed on Jun. 20, 2019, which claims the benefit of U.S. Provisional Application No. 62/688,690 filed on Jun. 22, 2018. The entire disclosures of the above applications are incorporated herein by reference.

FIELD

The present disclosure relates to a polymeric preform configured to be blow molded into a container.

BACKGROUND

This section provides background information related to the present disclosure, which is not necessarily prior art.

As a result of environmental and other concerns, plastic containers, more specifically polyester and even more specifically polyethylene terephthalate (PET) containers, are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

Injection blow molded PET containers have historically had neck straights that are uncontrollable without the use of process aids that have the potential to compromise other attributes of the container. With the rise of aseptic packaging and equipment that requires greater accuracy and precision for optimal performance, it is critical that neck straights are managed in such a way where performance is not compromised for a straight neck.

In traditional hot-fill lines, bottles are either conveyed by conveyor belts standing upright (base supported), or with air conveyors, which hold the bottle directly below the support flange (neck supported). Air conveyors require more consistent neck geometry to properly convey the blown bottle. Having a neck straight that maintains greater cylindricity is advantageous to the efficiency of handling.

Aseptic packaging lines require greater consistency in the neck straight than any other current filling process. Many aseptic filling lines transfer containers through a commercially sterile environment using both the neck straight below the support flange, and the geometry above the support flange. Neck straights are a critical performance factor in PET injection blow molded bottles for this application. Transfer failures due to irregularities in the neck straight can result in dropped, jammed, or improperly handled containers that are ejected from the filler. Aseptic lines must go through a rigorous sterilization prior to filling to ensure the environment and equipment inside the filler are commercially sterile. An event where downed bottles start impacting filler performance will require the operators to break sterility to clear the bottles. This type of event incurs significant downtime as it takes the filler hours to become commercially sterile after the filler is exposed to the external environment.

While current preforms and containers are suitable for their intended use, they are subject to improvement. For example and with reference to FIGS. 1A and 1B, a prior art preform is illustrated at reference numeral 110'. The preform 110' is made of any suitable polymeric material, such as polyethylene terephthalate (PET) for example. The preform 110' itself can be formed in any suitable manner, such as by injection molding. The preform 110' is configured to form a container 210' (see prior art FIGS. 2A, 2B, and 2C) in any suitable manner, such as by blow molding. The container 210' can be any suitable container of any suitable size, such as a 20 ounce, hot-fill container. The container 210' will be further described herein after the description of the preform 110'.

The preform 110' generally includes a first end 112' and a second end 114' opposite thereto. At the first end 112' is a finish portion 120' of the preform 110', which is also a container finish of the container 210'. At the first end 112' the finish 120' defines an opening 122' of the preform 110', which also provides a container opening of the container 210'. Extending from an outer surface of the finish 120' are threads 124', which can be any suitable threads configured to cooperate with a closure for closing the opening 122'. Also extending from the finish 120' is a support flange or ring 126', which can be used for supporting the preform 110' in a stretch blow molding machine, and which may provide the finish 120' with increased strength.

Between the finish 120' and the second end 114', the preform 110' includes a neck portion 128', a shoulder portion 130', a body portion 132', and a tip or base/heel portion 134'. The neck portion 128' is adjacent to, or generally adjacent to, the support flange 126'. The shoulder portion 130' is between the neck portion 128' and the body portion 132'. The base/heel portion 134' extends from the second end 114' towards the first end 112'. The body portion 132' is between the shoulder portion 130' and the base/heel portion 134'.

With reference to prior art FIG. 1B, the neck portion 128' includes an external stretch point or radius 150' and an internal stretch point or radius 152'. The external stretch point 150' is at a distance X' from the support flange 126'. The internal stretch point 152' is at a distance Y' from the support flange 126', and at a distance Z' from the external stretch point 150'.

With continued reference to FIGS. 1A and 1B, and additional reference to FIGS. 2A, 2B, and 2C, the neck portion 128' is configured to form a container neck 222', and the shoulder portion 130' is configured to form a container shoulder 224' of the container 210'. The body portion 132' is configured to form a container main body portion 226' of the container 210'. The base/heel portion 134' is configured to form a container base 240' and a container heel 242' of the container 210'. The preform 110' further includes an outer surface 140' and an inner surface 142', which is opposite to the outer surface 140'. The inner and outer surfaces 140' and 142' extend about each of the neck portion 128', the shoulder portion 130', the body portion 132', and the base/heel portion 134'. The preform 110' is generally circular, and is closed at the second end 114' by the base/heel portion 134'. A longitudinal axis A of the preform 110' extends through an axial center of the opening 122' at the first end 112', and through an axial center of the base/heel portion 134' at the second end 114'.

The prior art container 210' undesirably has a bulge 250' at the neck 222', as illustrated in FIGS. 2A, 2B, and 2C. The bulge 250' is generally formed at a distance X' from the support flange 126', and has a thickness T'. The bulge 250' is undesirable because it inhibits the ability of grippers to grasp the container 210' at the container neck 222' in order to pick up the container 210' below the support flange 126' without sticking or binding during transport.

The bulge 250' is a deformation typically observed when the preform 110' has the outer stretch point 150' located three millimeters from the bottom of the support flange 126' (i.e., distance X' is about three millimeters), and the inner stretch point 152' is 5.1 millimeters from the bottom of the support flange 126' (i.e., Y' is about 5.1 millimeters), and the distance between the external stretch point 150' and the internal stretch point 152' is 2.1 millimeters (i.e., Z' is about 2.1 millimeters).

Neck straight cylindricity beginning at the preform geometry is critical to improve line efficiencies in hot-fill and aseptic lines. The present disclosure advantageously prevents bulging from the injection blow molding process, and provides greater control to the distortion of the neck created by the stretch initiation point on the preform. Specifically, the present disclosure advantageously eliminates, or at least significantly reduces, the bulge 250', as explained in detail herein. One skilled in the art will appreciate that the present disclosure provides numerous additional advantages and unexpected results as well.

SUMMARY

This section provides a general summary of the disclosure, and is not a comprehensive disclosure of its full scope or all of its features.

The present disclosure includes a preform configured to form a container by stretch blow molding. A finish portion of the preform is at a first end of the preform. The finish portion is a container finish of the container. A support flange is at the finish portion. A tip portion is at a second end of the preform opposite to the first end and is configured to form a container base. A neck portion is adjacent to the support flange, and is configured to form a neck portion. An external stretch radius is at an outer surface of the neck portion. An internal stretch radius is at an inner surface of the neck portion. A first distance is between the internal stretch radius and the external stretch radius and is equal to, or greater than, four times a second distance between the external stretch radius and the support flange.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
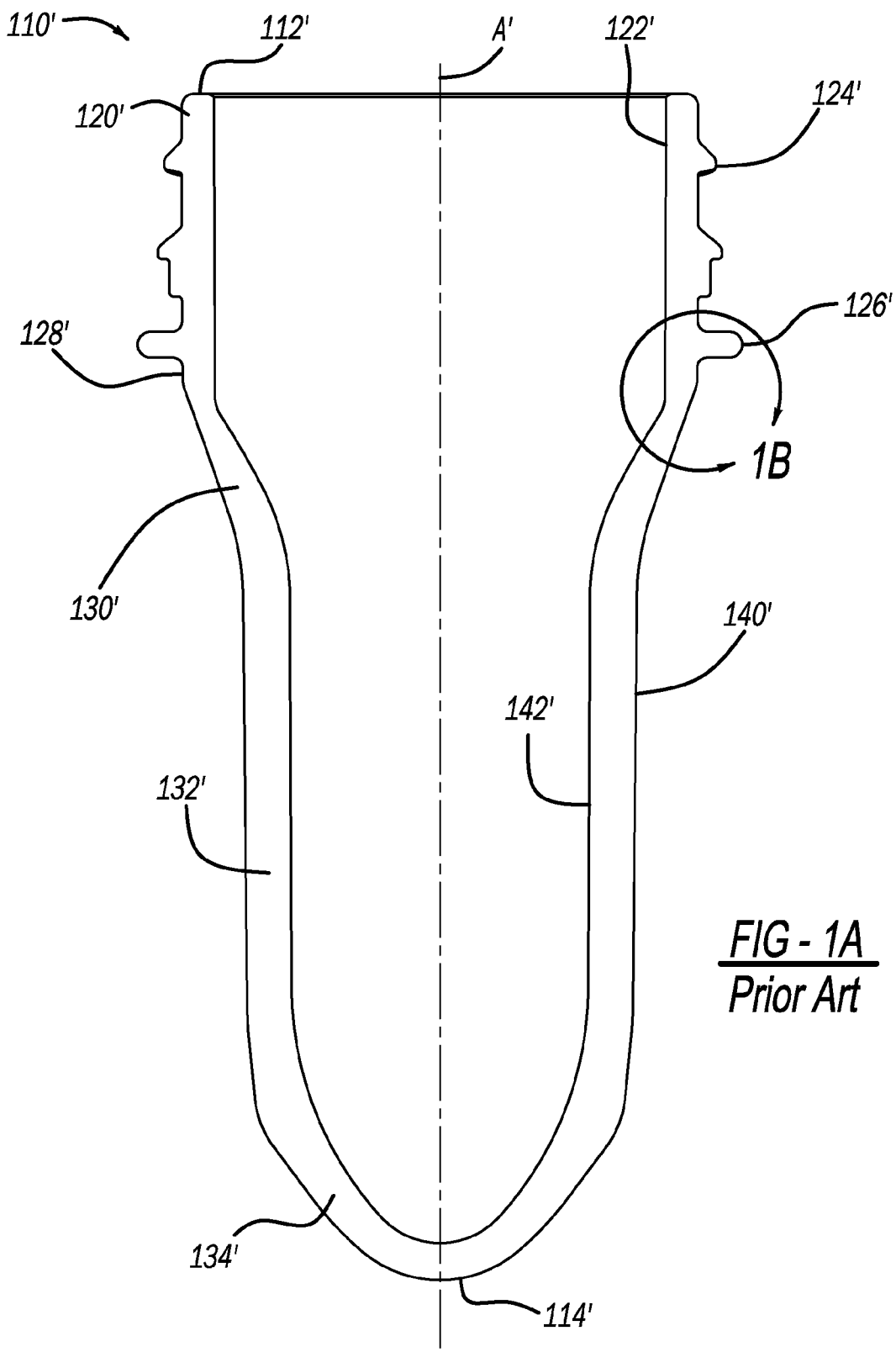
FIG. 1A illustrates a prior art container preform.
Figure 1B:
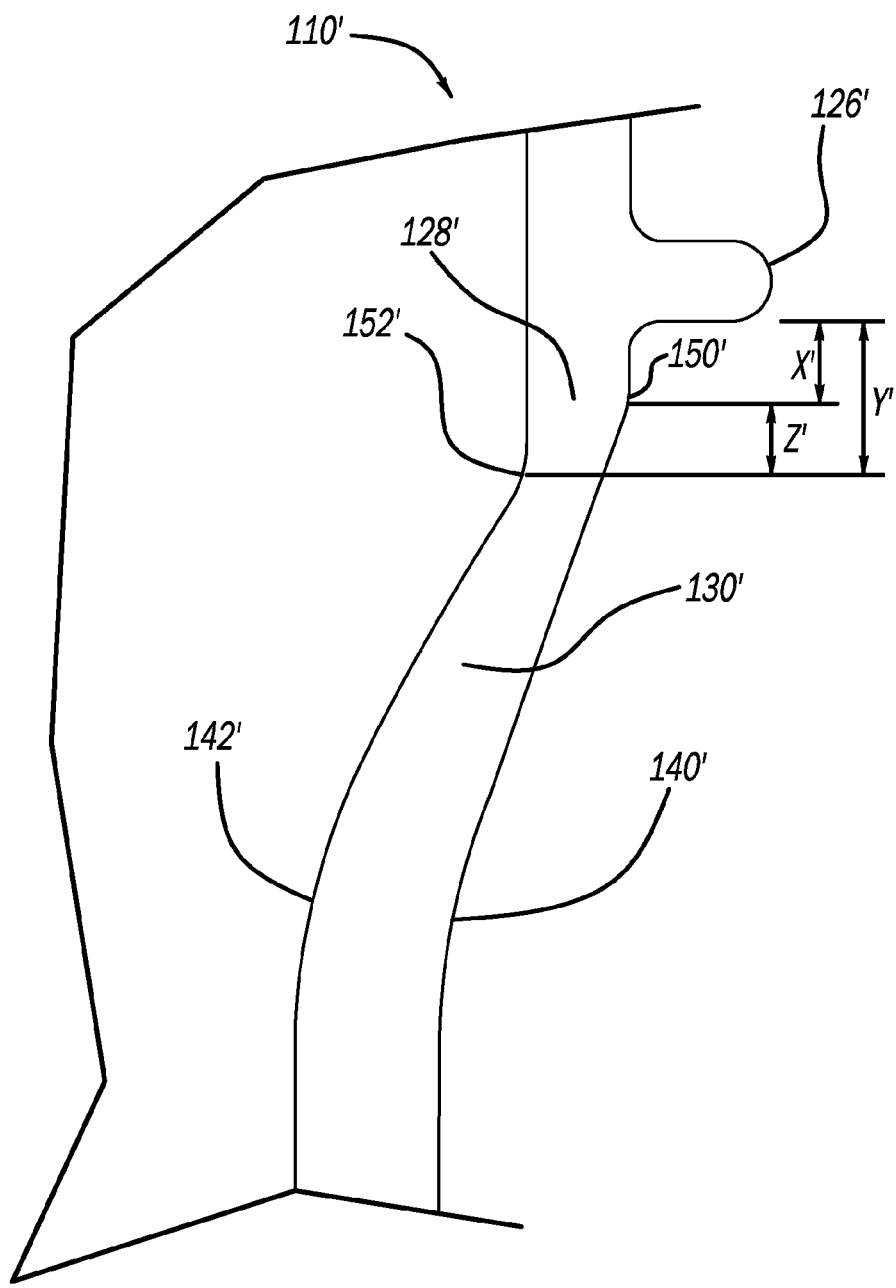
FIG. 1B illustrates area 1B of FIG. 1A.
Figure 2A:
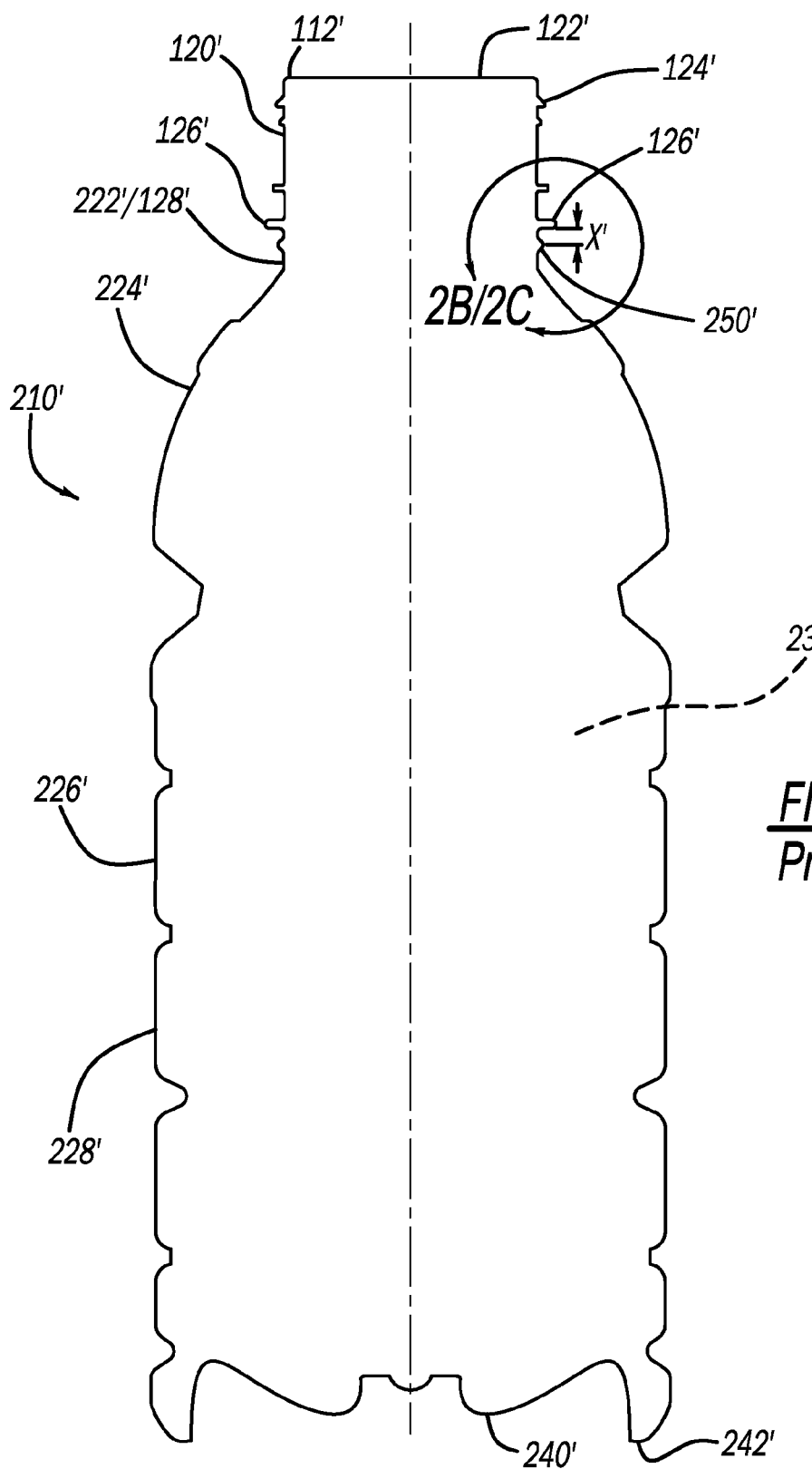
FIG. 2A illustrates a prior art container formed from the prior art preform of FIG. 1A.
Figure 2B:
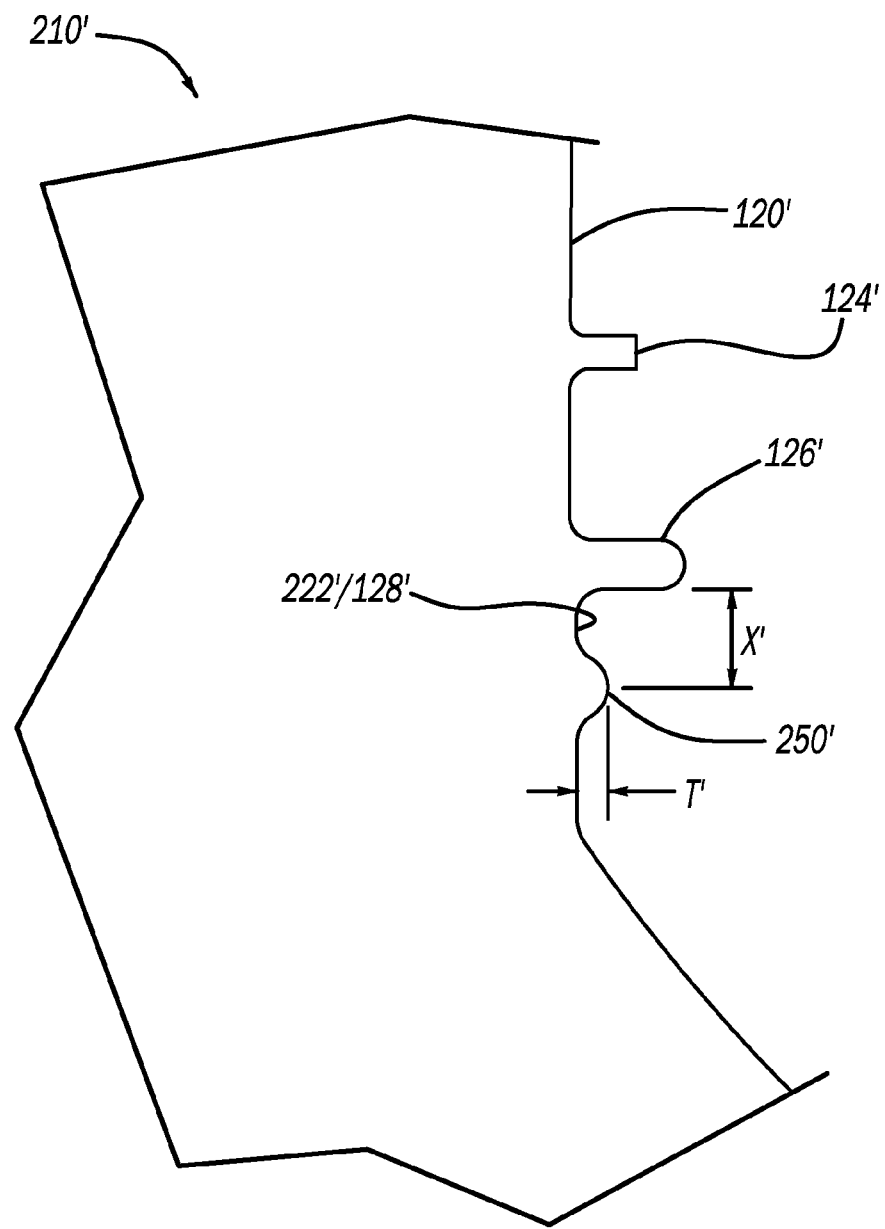
FIG. 2B illustrates area 2B/2C of FIG. 2A.
Figure 2C:
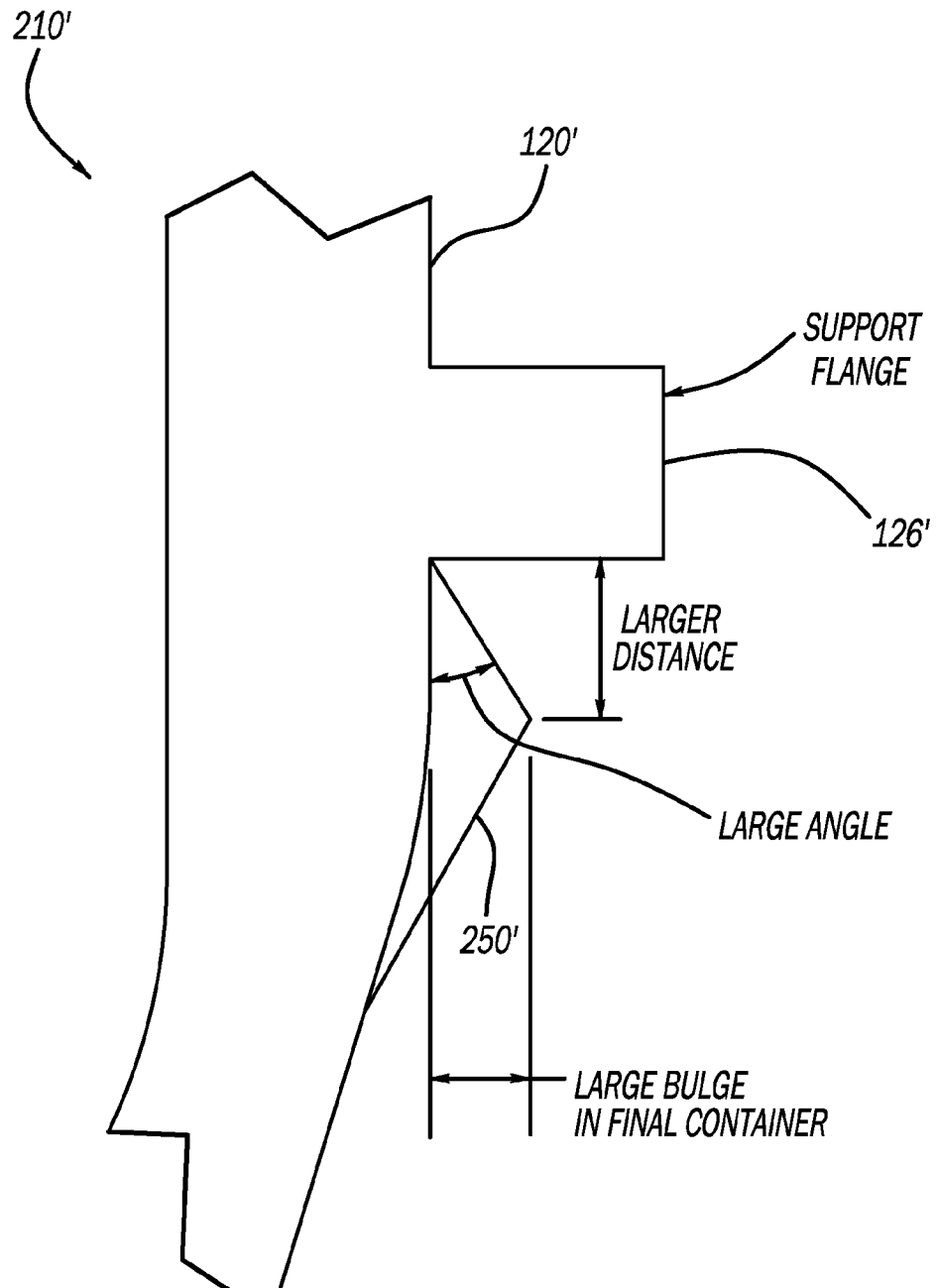
FIG. 2C illustrates area 2B/2C of FIG. 2A.
Figure 3A:
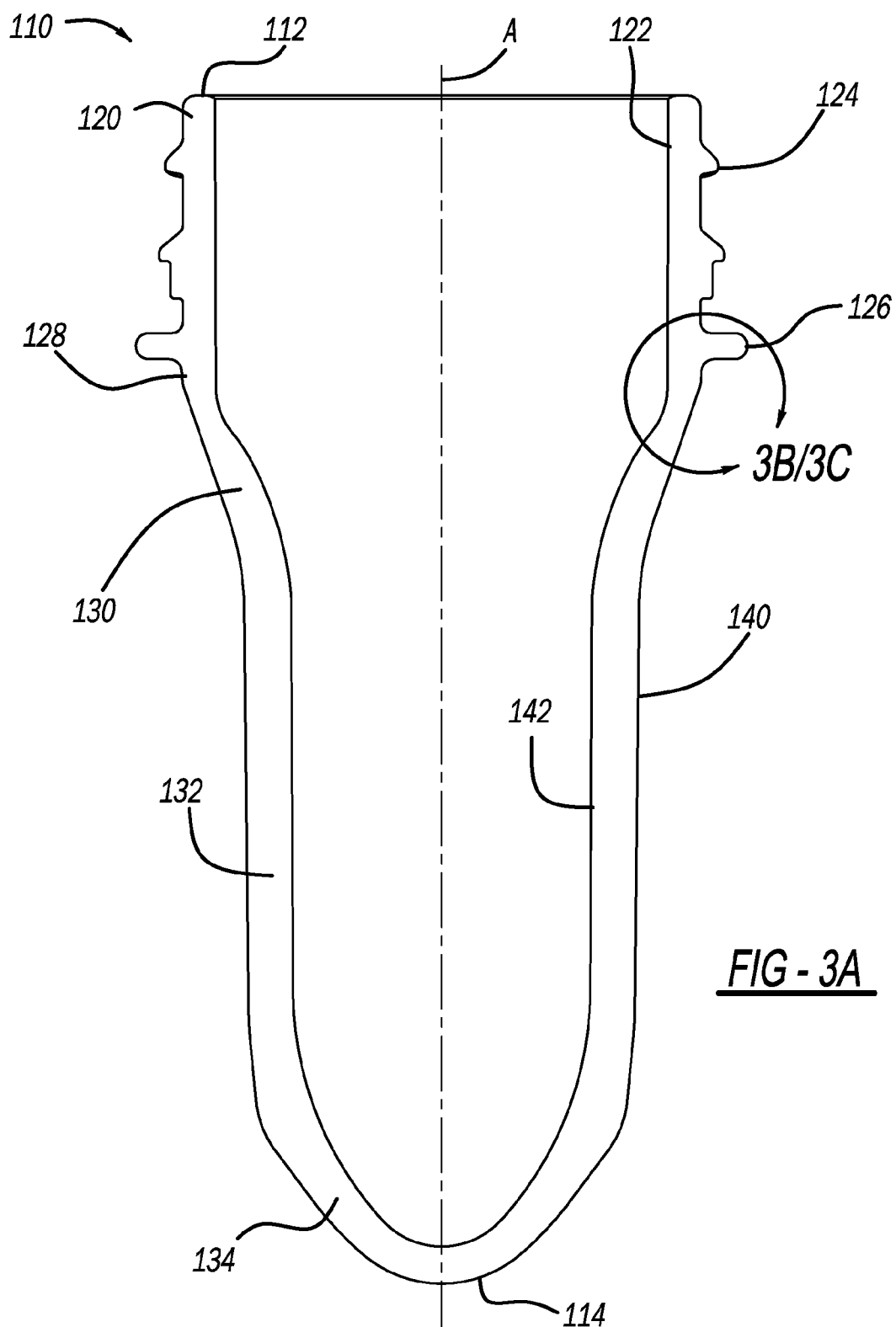
FIG. 3A illustrates a container preform in accordance with the present disclosure.
Figure 3B:
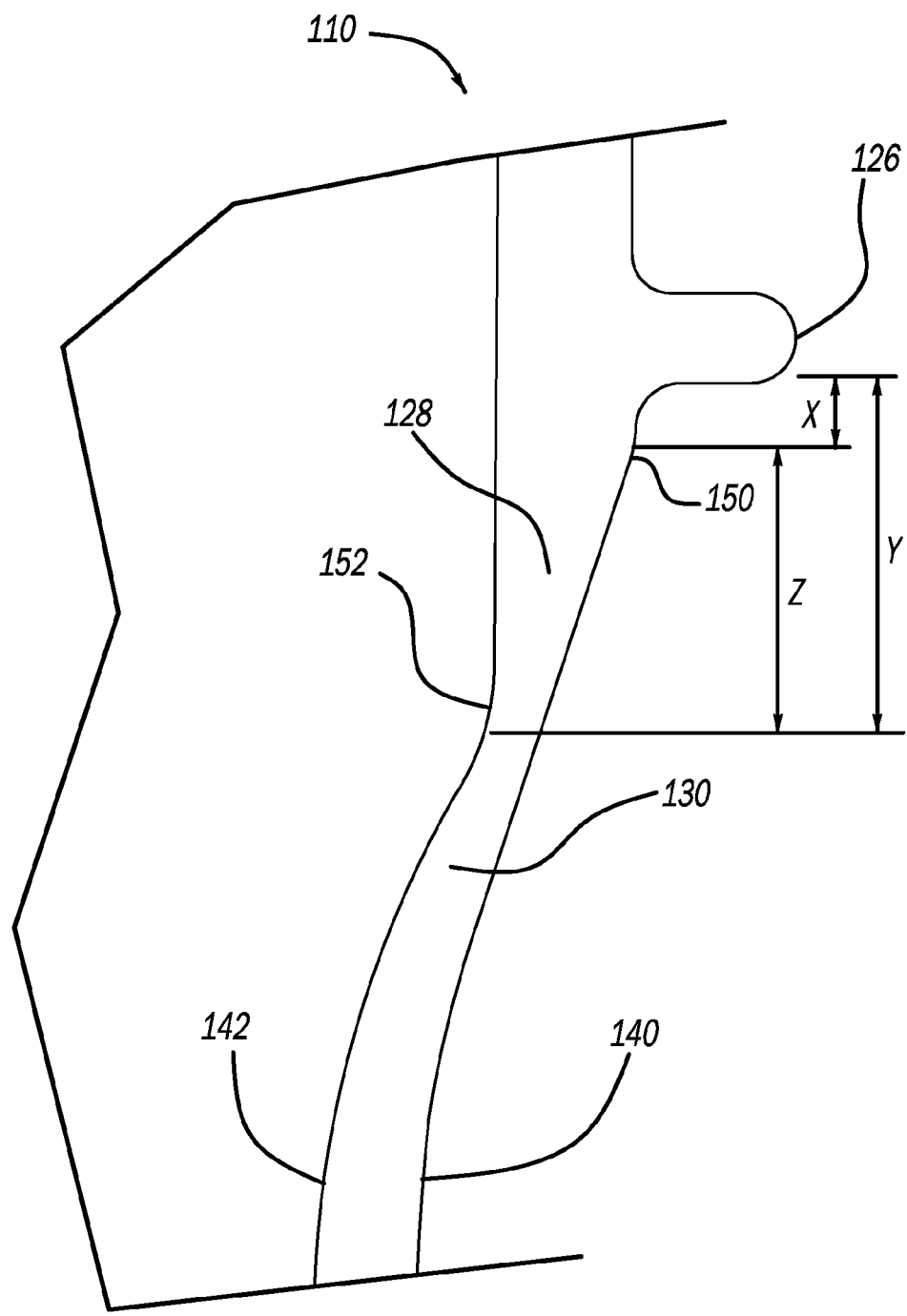
FIG. 3B illustrates area 3B/3C of FIG. 3A.
Figure 3C:
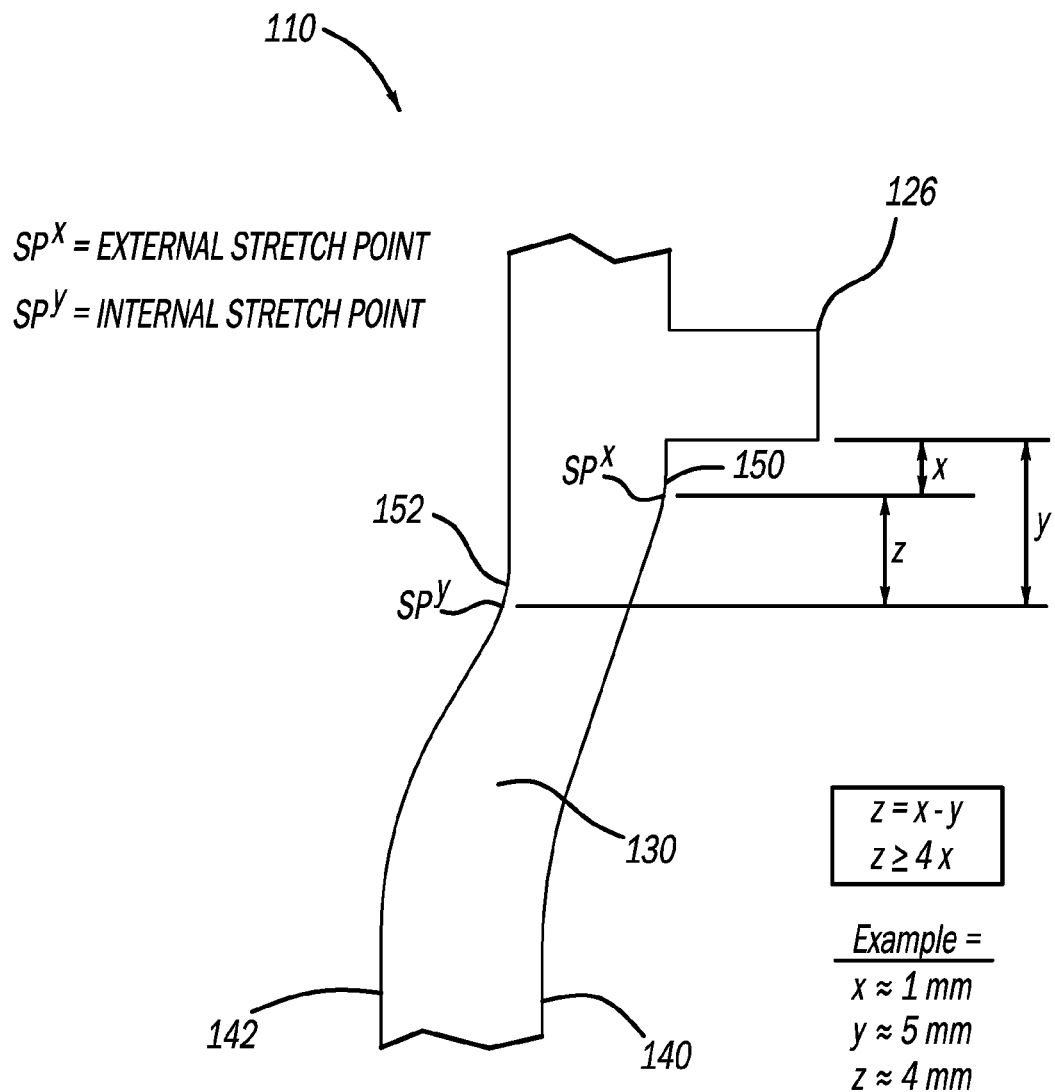
FIG. 3C illustrates area 3B/3C of FIG. 3A.

With reference to FIGS. 3A, 3B and 3C, a container preform in accordance with the present disclosure is illustrated at reference numeral 110. The preform 110 includes a number of features that are similar to the preform 110'. These similar features are identified in the drawings using the same reference numerals used in FIGS. 1A and 1B, but without the prime (') designation. The description of these similar features set forth in the background section is also sufficient to describe the similar features of the preform 110, with the exception of specific differences described herein.

The preform 110 includes an external stretch point or radius 150 and an internal stretch point or radius 152, which are stretch initiation points, the location and position of which influences how the preform 110 is stretched and formed into a final container during blow molding. With particular reference to FIG. 3B, the external stretch point 150 and the internal stretch point 152 of the preform 110 are arranged differently as compared to the external stretch point 150' and the internal stretch point 152' of the prior art perform 110'. Specifically and as compared to the preform 110', the external stretch point 150 is arranged closer to the support flange 126, and the internal stretch point 152 is arranged further from the support flange 126. Therefore, the distance Z between the external stretch point 150 and the internal stretch point 152 is greater than the dimension Z' between the external stretch point 150' and the internal stretch point 152'. Thus, the dimension X is less than the dimension X', the dimension Y is greater than the dimension Y', and the dimension Z is greater than the dimension Z'.

More specifically, with respect to the preform 110 of the present disclosure the distance Z between the external stretch point 150 and the internal stretch point 152 is greater than, or equal to, four times (or about four times) the distance X between the external stretch point 150 and the support flange 126. For example, in applications where the distance X between the external stretch point 150 and the support flange 126 is 1 mm, the distance Z between the internal stretch point 152 and the external stretch point 150 will be 4 mm, or at least about 4 mm. Thus the distance Y between the internal stretch point 152 and the support flange 126 will be 5 mm, or at least about 5 mm. Arranging the external stretch point 150 and the internal stretch point 152 in this matter provides numerous advantages, as explained below.

The container 210 is blow molded from the preform 110. Specifically, the preform 110 can be heated by oven lamps in a blow molding machine, and inserted into a blow mold where a stretch rod stretches the preform 110 lengthwise along the longitudinal axis A while high pressure air simultaneously expands the preform 110. The preform is forced into the walls of the mold. This creates the final shape of the container 210. The combination of heating the preform 110, stretching, and expanding creates stretch induced crystallinity in the polyethylene terephthalate material. In an additional step, the container can be heated by the walls of the mold to create heat induced crystallinity. This combination of stretch and heat induced crystallinity is referred to as heat-setting, which results in a stronger rigid container that resists shrinkage and is suitable to be filled with heated products.

Figure 4A:
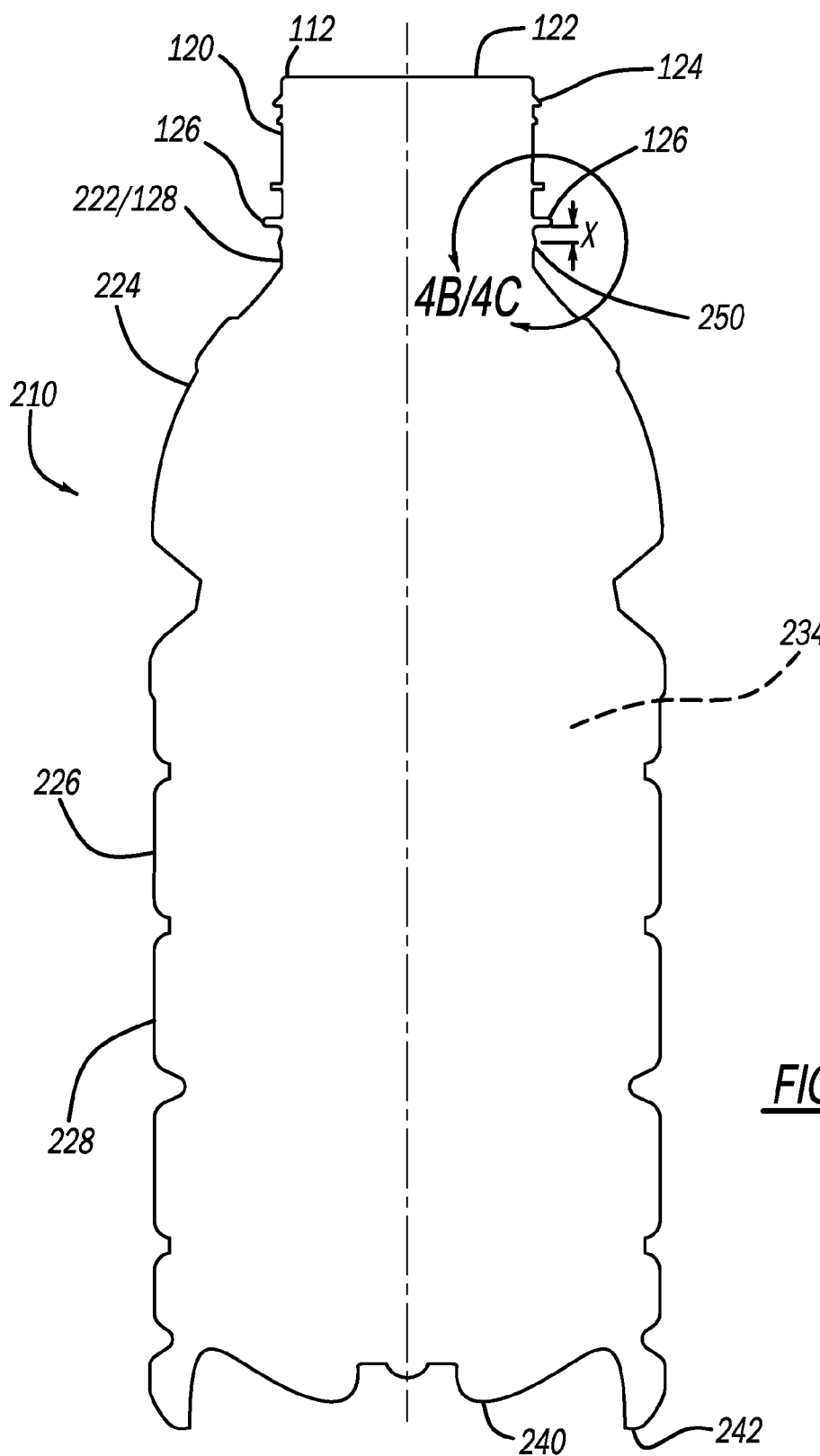
FIG. 4A illustrates a container in accordance with the present disclosure formed from the preform of FIG. 3A.
Figure 4B:
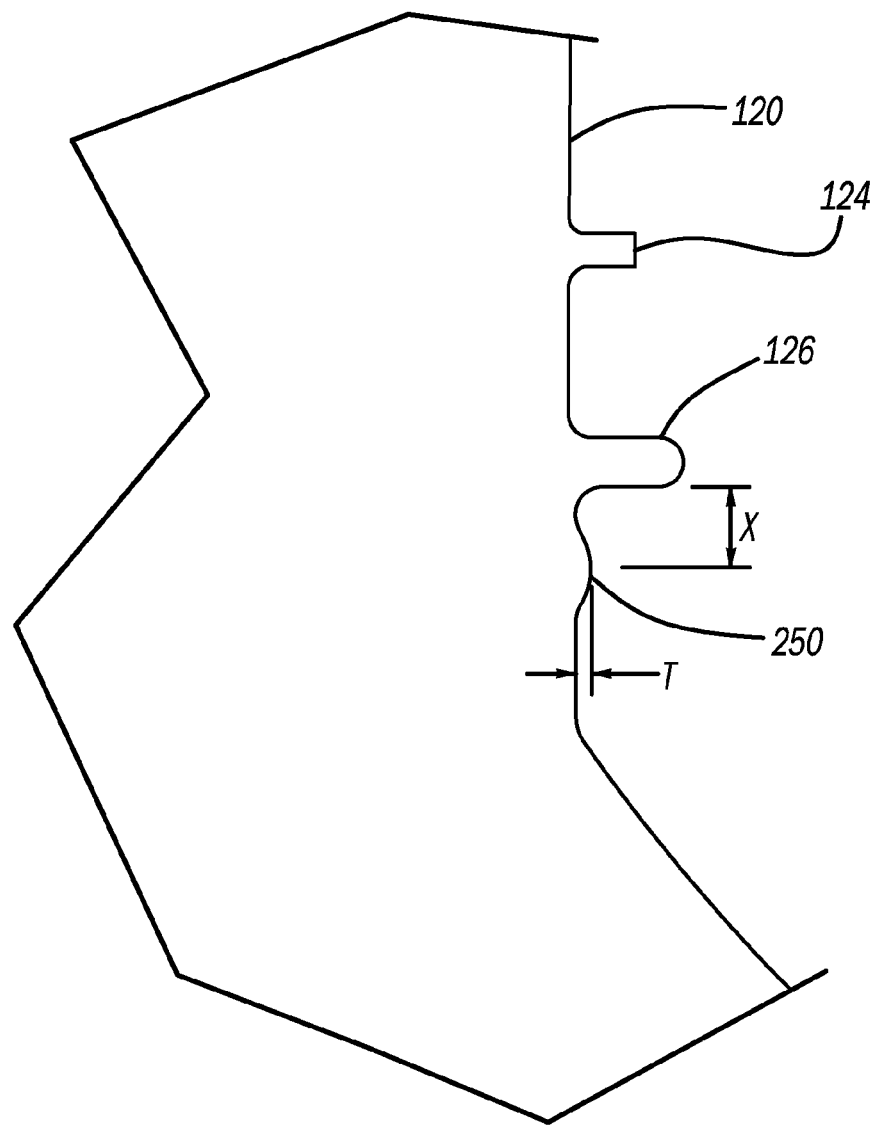
FIG. 4B illustrates area 4B/4C of FIG. 4A.
Figure 4C:
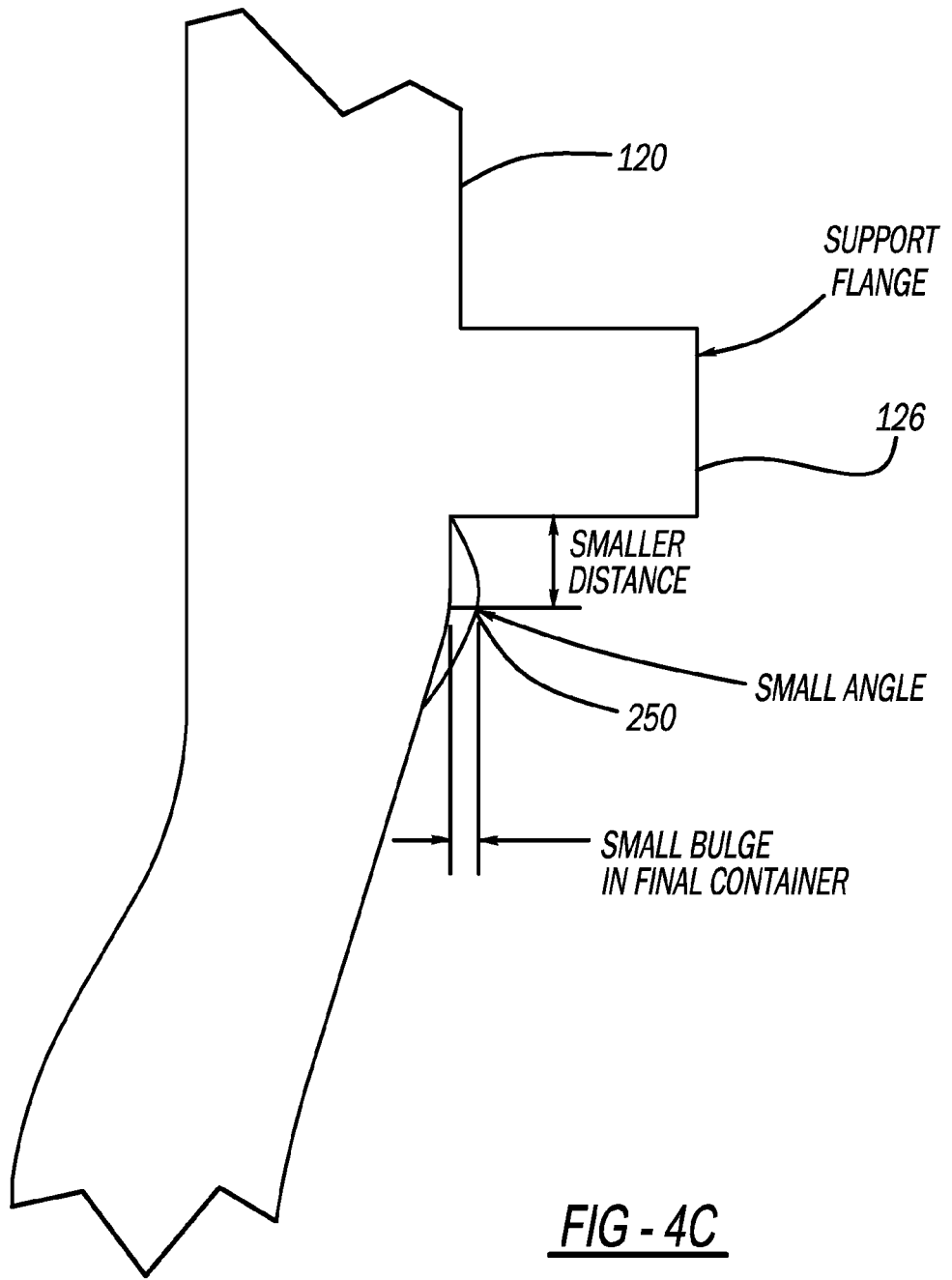
FIG. 4C illustrates area 4B/4C of FIG. 4A
Figure 5:
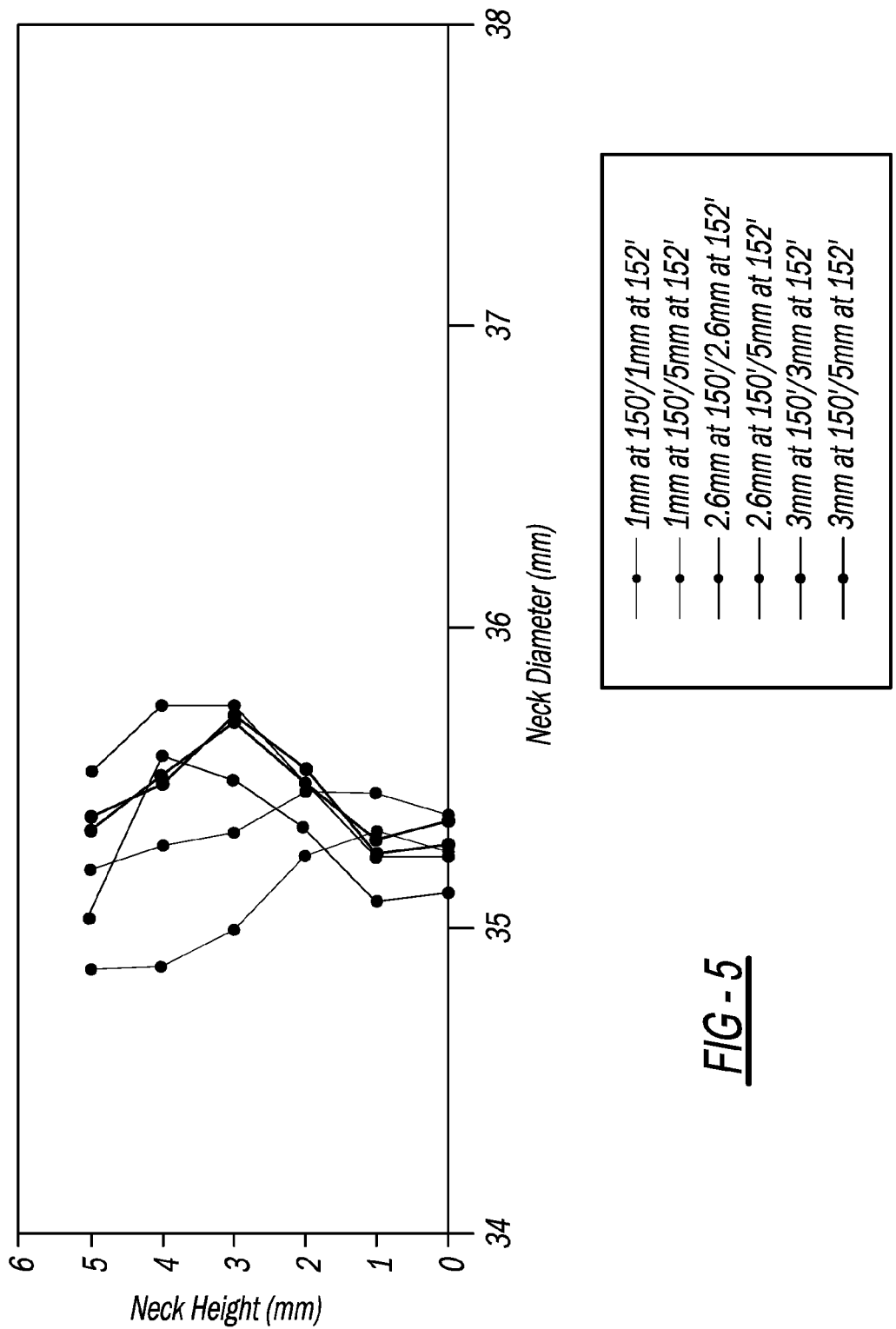
FIG. 5 illustrates neck straight planarity of various containers in accordance with the present disclosure.
Figure 6:
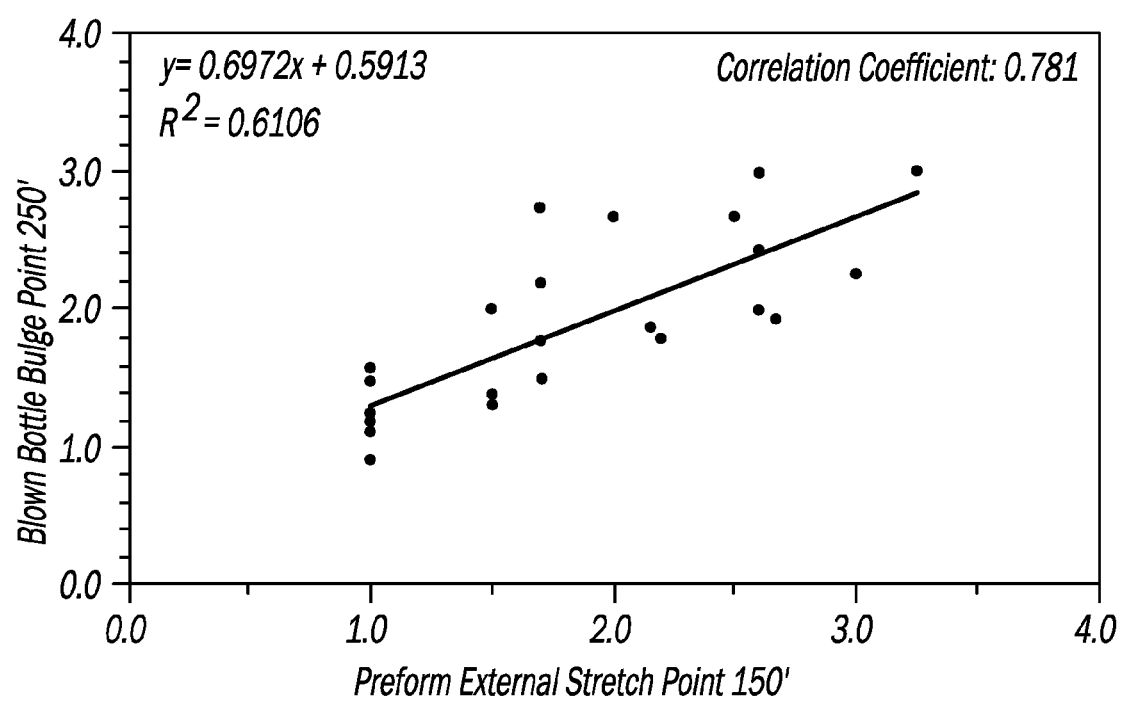
FIG. 6 illustrates relationship between preform external stretch point and blown bottle bulge point of various containers in accordance with the present disclosure.

Arranging the external stretch point 150 closer to the support flange 126 (as compared to the position of the external stretch point 150' relative to the support flange 126'), arranging the internal stretch point 152' relatively further from the support flange 126 (as compared to the distance between the internal stretch point 152' and the support flange 126'), and increasing the distance between the stretch points 150 and 152 (as compared to the distance between the internal and external stretch points 150' and 152') eliminates or significantly reduces deformation of the resulting container 210 (see FIGS. 4A, 4B, and 4C) at the neck portion 222. For example and as illustrated in FIGS. 4A, 4B and 4C, the exemplary container 210 formed from the preform 110 has only a very small bulge 250 at the neck 222. The bulge 250 has a thickness T, which is much smaller than the thickness T' of the bulge 250'. The relatively small thickness T advantageously does not inhibit grasping of the container 210 by grippers used for picking up the container 210 below the support flange 126, and permits grasping without sticking or binding during transport. FIG. 5 illustrates neck straight planarity of various containers in accordance with the present disclosure, and FIG. 6 illustrates relationship between preform external stretch point and blown bottle bulge point of various containers in accordance with the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A preform configured to form a container by stretch blow molding, the preform comprising:
    a finish portion at a first end of the preform, the finish portion is a container finish of the container;
    a support flange of the finish portion;
    a tip portion at a second end of the preform opposite to the first end, the tip portion configured to form a container base of the container, a longitudinal axis of the preform extends in a lengthwise direction from the first end to the second end of the preform through an axial center of the finish portion and a center of the tip portion;
    a neck portion adjacent to the support flange, the neck portion configured to form a neck portion of the container;
    an external stretch radius at an outer surface of the neck portion, the external stretch radius is curved and extends in the lengthwise direction;
    an internal stretch radius at an inner surface of the neck portion, the internal stretch radius is curved and extends in the lengthwise direction, a first distance between the internal stretch radius and the external stretch radius is equal to, or greater than, four times a second distance between the external stretch radius and the support flange;
    a shoulder portion adjacent to the neck portion and configured to form a container shoulder of the container; and
    a body portion between the shoulder portion and the tip portion, the body portion configured to form a container body of the container.

2. The preform of claim 1, wherein the first distance is 4 mm.

3. The preform of claim 2, wherein the second distance is 1 mm.

4. The preform of claim 3, wherein the internal stretch radius is 5 mm from the support flange.

5. The preform of claim 1, wherein the external stretch radius is between the internal stretch radius and the support flange.

6. The preform of claim 1, wherein the preform is configured to form a hot fill container.

* * * * *